US007743999B1

(12) United States Patent
Griffin

(10) Patent No.: US 7,743,999 B1
(45) Date of Patent: Jun. 29, 2010

(54) CASE FOR PORTABLE ELECTRONIC DEVICE HAVING EXTERNAL ACCESS PORT

(75) Inventor: Paul Griffin, Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 725 days.

(21) Appl. No.: 11/374,829

(22) Filed: Mar. 14, 2006

(51) Int. Cl.
*G06K 7/00* (2006.01)

(52) U.S. Cl. .................. 235/486; 206/232; 206/307; 206/308.1; 206/312; 206/387.13; 224/222; 224/236; 224/257; 224/673; 224/930

(58) Field of Classification Search .................. 235/486; 206/232, 307, 308.1, 312, 387.13
See application file for complete search history.

(56) References Cited

U.S. PATENT DOCUMENTS

| | | | | |
|---|---|---|---|---|
| 4,842,032 | A | 6/1989 | Mastronardo | 206/309 |
| 5,267,679 | A | 12/1993 | Kamaya et al. | 224/151 |
| 5,436,625 | A * | 7/1995 | Kubo | 341/22 |
| 6,006,915 | A | 12/1999 | Moor | 206/579 |
| D418,287 | S | 1/2000 | Moor | D3/201 |
| 6,056,174 | A | 5/2000 | Minckler | 224/250 |
| D429,065 | S | 8/2000 | Hillman | D3/218 |
| 6,239,969 | B1 * | 5/2001 | Howell et al. | 361/679.55 |
| 6,356,442 | B1 * | 3/2002 | Lunsford | 361/686 |
| 6,525,928 | B1 * | 2/2003 | Madsen et al. | 361/679.56 |
| 6,646,864 | B2 * | 11/2003 | Richardson | 361/681 |
| 6,819,549 | B1 * | 11/2004 | Lammers-Meis et al. | 361/679.55 |
| 6,926,139 | B1 | 8/2005 | Poole | 206/232 |
| 2004/0147225 | A1 * | 7/2004 | Chen | 455/45 |
| 2004/0230356 | A1 * | 11/2004 | Namaky | 701/29 |
| 2005/0079904 | A1 * | 4/2005 | Hussaini et al. | 463/1 |
| 2005/0181745 | A1 * | 8/2005 | Wood et al. | 455/90.3 |

* cited by examiner

*Primary Examiner*—Daniel A Hess
*Assistant Examiner*—Ali Sharifzada
(74) *Attorney, Agent, or Firm*—Hornkohl Intellectual Property Law, PLLC; Jason C. Hornkohl

(57) ABSTRACT

A case for portable electronic device has a set of substantially rigid opposing faces mounted on a hinge that fold together to enclose the device. An internal electrical connection between the device and the case is used to provide an electrical access point on the exterior of the case. The external electrical connection is accomplished through a passive electrical connector positioned on the hinge that holds the opposing faces together. Additional active electronics and batteries may also be positioned in the hinge such that the case can be operationally linked with the device contained in the case. Since many portable electronic devices are dimensioned to be carried in pockets or purses, limiting the size of a protective carrying case can be crucial to gaining consumer acceptance. The case is particularly well adapted for use with a digital music player.

8 Claims, 2 Drawing Sheets

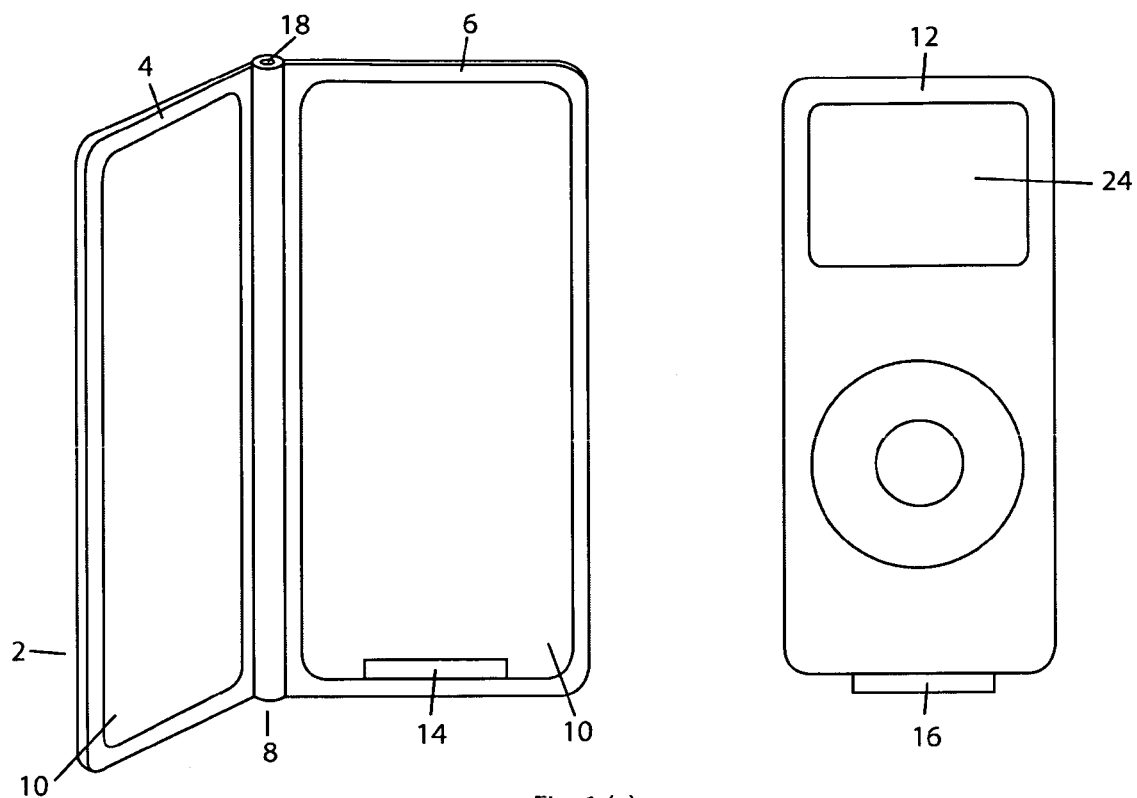
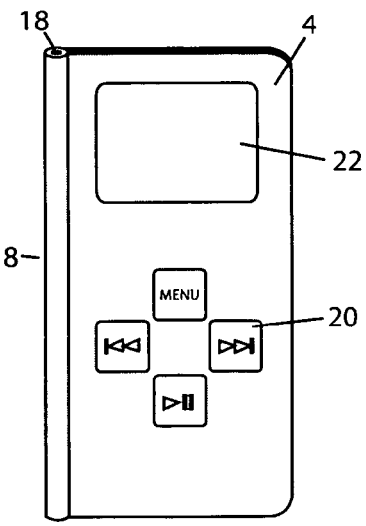
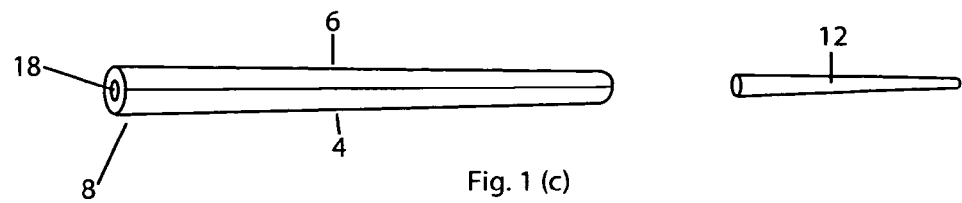

CASE FOR PORTABLE ELECTRONIC DEVICE HAVING EXTERNAL ACCESS PORT

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

FIELD OF THE INVENTION

The invention is generally directed toward the field of accessories for portable electronic devices. More particularly, the present invention is directed toward a hinged case for a portable electronic device that provides electrical access to the device through a port on the exterior of the case.

BACKGROUND OF THE INVENTION

A wide variety of cases and holders have been developed for portable electronic devices such as digital music players and cellular telephones. Many of these cases are constructed from flexible materials such as silicone or leather. These cases may have openings that provide access to the user inputs and displays of the device that is being held in the case. Unfortunately, these openings may allow the controls and displays of the device to be inadvertently activated or damaged due to their exposure. In addition, these soft cases may provide little protection for the device if it is dropped or impacted by a hard object. Hard protective cases constructed from substantially rigid metal or plastic that can withstand impacts are also known in the prior art. While these types of cases are better at protecting electronic devices from impacts, they do not provide access to the functions of the device when it is enclosed in the case. They also tend to be bulky and undesirably increase the combined weight and size of the case and portable electronic device. Therefore, what is needed is an improved case for a portable electronic device that provides protection for the device as well as access to the device's functions without substantially increasing the weight or size of the device.

BRIEF SUMMARY OF THE INVENTION

An embodiment of the present invention is directed toward a case for a portable electronic device such as a digital music player. The case is preferably constructed from a substantially rigid plastic or metal. The case includes a pair of opposing case faces connected with a hinge portion. The opposing faces are adapted to fold together to removably enclose the portable electronic device between the opposing faces. An internal electrical contact on one of the opposing faces engages a port of the portable electronic device when the portable electronic device is enclosed within the opposing faces. An external electrical contact, such as an audio output jack, positioned on an end of the hinge portion is electrically connected to the internal electrical contact such that a function of the portable electronic device can be accessed through the external electrical contact. The case preferably includes a case microprocessor for communicating with a device microprocessor such that a function of the portable electronic device can be controlled by the case microprocessor. A battery for powering the case electronics and/or the portable electronic device is contained within the hinge portion. The case may also include an opening in one of the opposing faces such that a display of the portable electronic device can be viewed through the opening. The case may include an FM transmitter for broadcasting a signal received from the portable electronic device to a remote receiver.

Another embodiment of the present invention is directed toward a case for a portable electronic device. The case includes a front and back face connected by a hinge. The front and back face fold together to enclose the portable electronic device. An electrical contact is positioned on one of the front and back faces. The electrical contact electrically connects a port of the portable device to a port of the case. The case port is preferably positioned on the hinge. The electrical contact also preferably enables communication between a device microprocessor and a case microprocessor such that a function of the device can be controlled by a user input positioned on an exterior of the case. The hinge also includes a power supply that provides power to the portable electronic device when the device is positioned in the case. The positioning of the case port and power supply in the hinge allows an outside dimension of the case to be substantially the same as an outside dimension of the portable electronic device. The case includes a transmitter that receives a signal from the portable electronic device and transmits the signal to a remote receiver.

Yet another embodiment of the present invention is directed toward a case for a portable electronic device. The case has a front face and a back face connected with a hinge. The front and back face fold together to enclose the portable electronic device within the case. The case includes an electrical contact that receives signals from the portable electronic device when the portable electronic device is enclosed within the case. An exterior port is positioned on an exterior portion of the case, preferably on one end of the hinge. The exterior port provides electrical access to the portable electronic device when the portable electronic device is enclosed within the case. If the portable electronic device is a digital music player, the exterior port is preferably an audio jack that provides access to an audio output signal produced by the digital music player. Due to the placement of the exterior port on the hinge, the case may be designed such that the height and width of the case is substantially the same as a height and width of the digital music player.

BRIEF DESCRIPTION OF THE SEVERAL VIEWS OF THE DRAWINGS

FIGS. 1(*a-c*) are illustrations of a case for a portable electronic device constructed in accordance with an embodiment of the present invention.

DETAILED DESCRIPTION OF THE INVENTION

Figure 2:
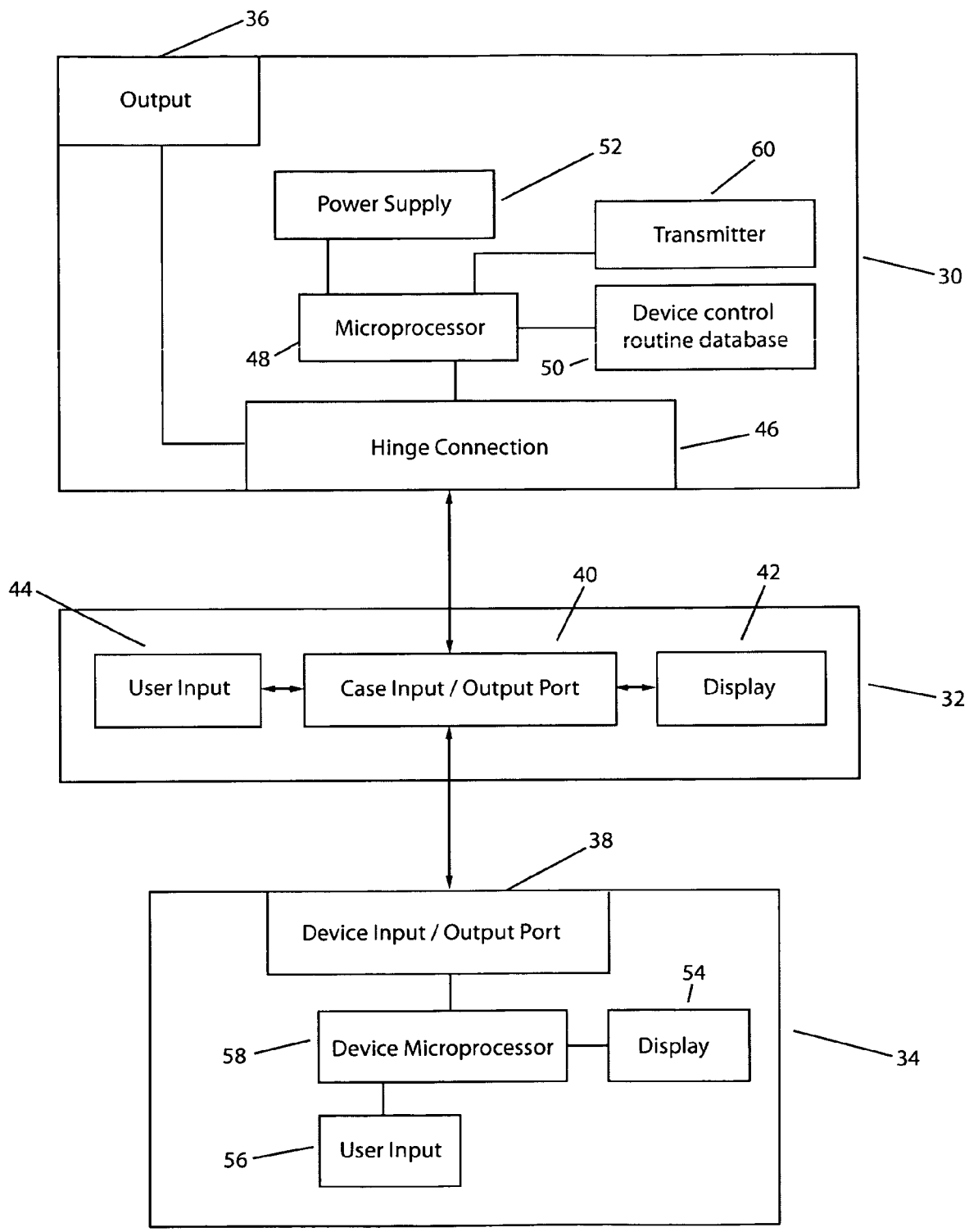
FIG. 2 is a block diagram of the electronics for a case constructed in accordance with an embodiment of the present invention.

Referring now to FIGS. 1(*a-c*), illustrations of a case 2 for a portable electronic device 12 constructed in accordance with an embodiment of the present invention are shown. As shown in FIG. 1(*a*), the case 2 consists of two opposing faces 4 and 6 connected by a hinge 8. The opposing faces 4 and 6 come together to form a cavity 10 that is shaped to receive the portable electronic device 12 with which the case 2 is designed to be used. An electrical contact 14 is positioned within the cavity 10 such that it mates with an input/output port 16 of the portable electronic device. The electrical contact 14 may be a standard connector used in connection with the portable electronic device 12. The electrical contact 14 receives electrical signals from the portable electronic device 12 that are coupled to an input/output port 18 that is preferably positioned on the end of the hinge 8 of the case 2. The case's input/output port 18 may be the same type of connector as the device's input/output port 16. This allows any accessories, such as headphones, that are designed to be coupled to the device's port 16 to be coupled to the case's input/output port 18. However, the input/output port 18 does not have to be the same type of connector as the device's port 16. The input/output port 18 may use any standard or proprietary connection designed to convey any signal from port 16. For example, port 18 could be a 3.5 mm jack carrying stereo audio from the port 16, or a USB connection carrying power to port 16.

As shown in FIG. 1(b), electronics may be positioned in the hinge 8 and on the faces 4 and 6 of the case 2. For example, a set of user controls 20 may be positioned on the face 6 such that a user can control functions of the portable electronic device 12 through the controls 20 on the case 2. In addition, a display 22 may be incorporated into one of the faces 4 and 6 that mimics the display 24 of the device 12 held in the case 2. The display 22 is controlled by a small microprocessor that is positioned in the hinge 8 or on one of the faces 4 and 6 of the case 2. Due to the low profile of modern microprocessors, the microprocessor can be positioned in one of the faces 4 and 6 without appreciably increasing the required dimensions of the case 2. Alternatively, an opening may be provided in the face 4 so that the display 24 of the device 12 can be viewed through the case face 4. However, this may not be desirable in many circumstances since it exposes the display 24 to potential damaging impacts if the case 2 is dropped.

The case's input/output port 18 is preferably positioned in the hinge 8 of the case 2 to allow the thickness and length of the case 2 to be minimized. If the port 18 is positioned on one of the faces 4 and 6, the faces 4 and 6 must be at least as wide as the port connector 18. However, if the port connector 18 is positioned on the hinge, the width and length of the case 2 can be substantially the same as the device 12 held inside the case as shown in FIG. 1(c).

A block diagram of the electronics of the case 32 and hinge 30 body portions of a protective case for a portable electronic device 34 constructed in accordance with an embodiment of the present invention is shown in FIG. 2. The case body 32 is electrically connected to the portable electronic device 34 through a case input/output port 40 that is coupled to the device input/output port 38. The case body 32 is connected to the hinge body 30 of the case through a hinge connection 46. An output port 36 located in the hinge body 30 is electrically connected to the input/output port 40 of the case 32 which is in turn electrically connected to the input/output port 38 of the device 34 when the device 34 is mounted in the case. Thus, the output port 36 provides electrical access to the device 34 on the exterior of the case 30 and 32. The output port 36 is preferably positioned in the hinge body 30 to minimize the size requirements of the case body 32. In a preferred embodiment, the device 34 is a digital music player and the output port 36 is an audio jack that allows headphones or exterior speakers to be used with the digital music player while it is securely mounted within a protective carrying case that includes the hinge 30 and case bodies 32.

The case body 32 may include a display 42 and a set of user inputs 44 that may be used to control the device 34 while it is held in the case as discussed in more detail herein. In such an embodiment, the hinge 30 contains a microprocessor 48 for controlling the functioning of the display 42 and user inputs 44. Due to the low profile of modern microprocessors, the microprocessor 48 may be located in the case body 32 without substantially increasing its required dimensions. Preferably, the microprocessor 48 has access to a control data base 50 that contains the control codes needed to functionally communicate with a microprocessor 58 in the portable electronic device 34. The case microprocessor 48 can use these controls to alter the case display 42 to reflect the display 54 of the portable electronic device 34 and enable a user to use the user inputs 44 of the case 32 to control functions of the portable electronic device 34 that would normally be controlled through manipulation of the user inputs 56 of the portable electronic device 34.

The hinge body 30 also preferably contains a power supply 52 that provides power to the microprocessor 48 and, if desired, the device 34 contained within the case body 32. The power supply 52 may be a set of batteries which, due to their cylindrical shape, are well adapted for placement in the hinge 30. The case body 32 or hinge 30 may also be provided with a power port for connection to an external power supply that can be used to power, or recharge the batteries of, the case 30 and 32 and/or the portable electronic device 34.

The hinge portion 30 may also contain a transmitter 60 such as an FM transmitter that is used to broadcast a signal received from the portable electronic device to a remote receiver. Transmitters are widely used as accessories for digital music players to transfer music from the player to a nearby radio receiver. By positioning the transmitter in the hinge 30 or main case body 32, a user can broadcast audio signals from the music player to the radio while the music player is securely protected in the case.

It will be appreciated by those skilled in the art that not all of the components shown in FIG. 2 will be required for every embodiment and that some components may be positioned in either the case's hinge portion 30 or body portion 32. In particular, in an embodiment having only the hinge mounted output port 36, only passive electronics such as the case output port 36 and an electrical connection to the device output port 38 will be required in the case body 30 and hinge 32.

Although there have been described particular embodiments of the present invention of a new and useful Case for Portable Electronic Device Having External Access Port, it is not intended that such references be construed as limitations upon the scope of this invention except as set forth in the following claims.

What is claimed is:

1. A case for a portable digital music player, said case comprising:

a pair of opposing case faces constructed from a substantially rigid plastic or metal connected with a hinge portion wherein said opposing faces are adapted to fold together to removably enclose said portable digital music player between said opposing faces;

an opening in one of said opposing faces wherein a display for said portable electronic device can be viewed though said opening;

an internal electrical contact comprising an audio input on one of said opposing faces such that said internal electrical contact engages an audio output port of said portable digital music player when said portable digital music player is enclosed within said opposing faces; and an external electrical contact comprising an audio output on an end of said hinge portion wherein said external electrical contact is electrically connected to said internal contact such that said audio output of said portable digital music player can be accessed through said external electrical contact.

2. The case of claim 1 wherein said case further comprises an FM transmitter for broadcasting a signal received from said portable digital music player to a remote receiver.

3. The case of claim 1 wherein a battery for said case is contained in said hinge portion.

4. The case of claim 1 wherein said case includes a case microprocessor for communicating with a device microprocessor such that a function of said portable digital music player can be controlled by said case microprocessor.

5. A case for a portable electronic device, said case comprising:
- a front and back face connected by a hinge such that said front and back face can fold together to enclose said portable electronic device;
- an electrical contact positioned on one of said front and back faces wherein said electrical contact electrically connects an audio output port of said portable electronic device to an audio output port of said case positioned on said hinge; and
- a transmitter for receiving a signal from said portable electronic device and transmitting said signal to a remote receiver;
- wherein said hinge further comprises a backup battery that provides power to said portable electronic device when said device is positioned in said case.

6. The case of claim 5 wherein an outside dimension of said case is substantially the same as an outside dimension of said portable electronic device.

7. The case of claim 5 wherein said electrical contact enables communication between a device microprocessor and a case microprocessor such that a function of said device can be controlled by user input positioned on an exterior of said case.

8. A case for a portable digital music player, said case comprising:
- a front face and a back face connected with a hinge such that said front face and back face fold together to enclose said portable digital music player within said case;
- an electrical contact wherein said electrical contact receives signals from said portable digital music player when said portable digital music player is enclosed within said case; and
- an exterior port comprising an audio output that provides access to an audio output signal produced by said portable digital music player positioned on an end of said hinge of said case;
- wherein a height and width of said case is substantially the same as a height and width of said portable digital music player.

* * * * *